United States Patent Office 3,350,932
Patented Nov. 7, 1967

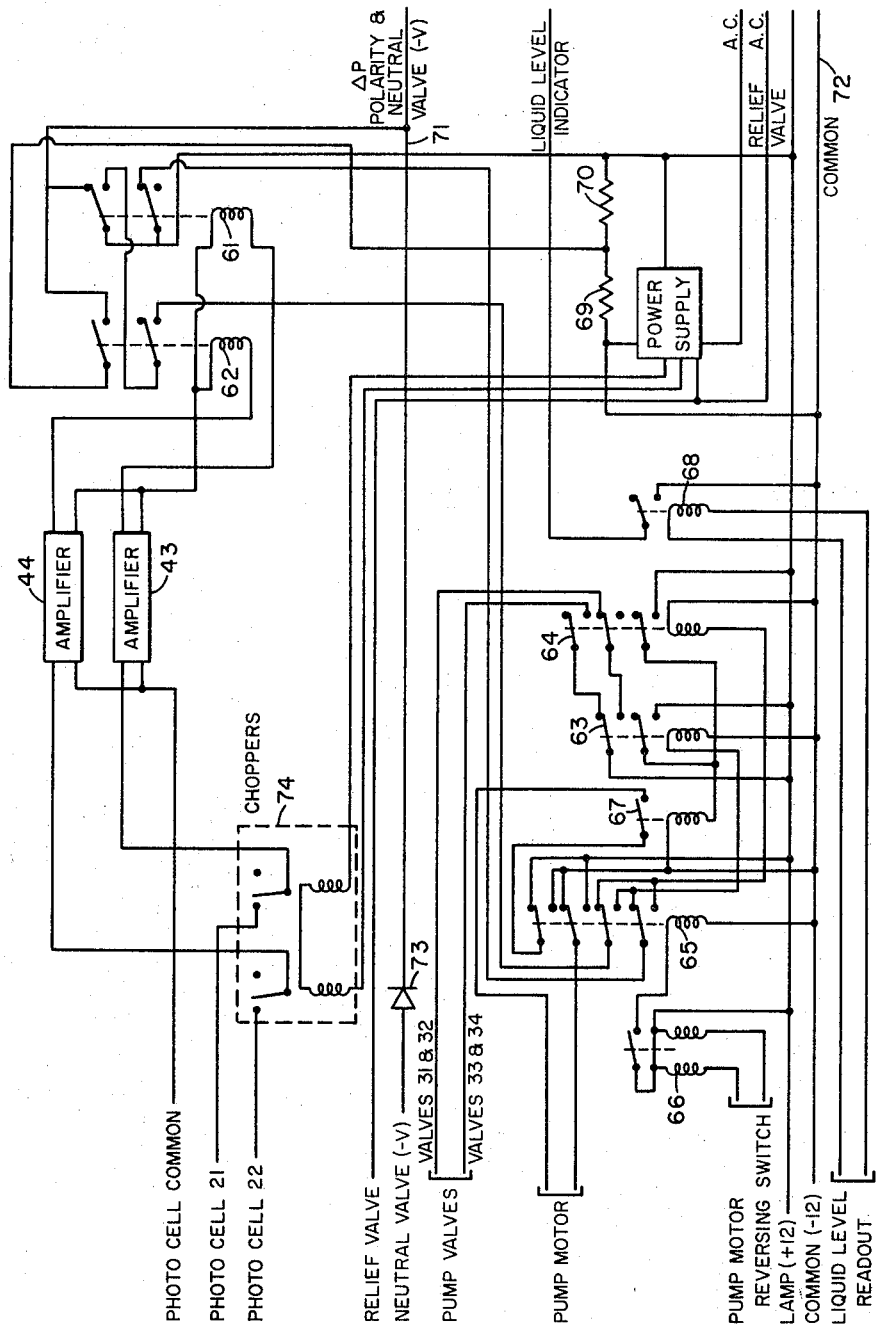

3,350,932
SYSTEM FOR MEASURING CHANGES
IN FLUID PRESSURE
Robert A. Kirby and Laurence K. Shallenberger, Houston, Tex., assignors to Esso Production Research Company, a corporation of Delaware
Filed Mar. 20, 1967, Ser. No. 624,390
10 Claims. (Cl. 73—152)

ABSTRACT OF THE DISCLOSURE

Automated, differential-pressure, sensing device adapted to be lowered within an oil well, including means for balancing the fluid pressure of a reference cell against the well pressure and metering fluid to-and-from the reference cell as required to maintain a balanced condition.

Cross reference to related application

This application is a continuation-in-part of copending U.S. application S.N. 428,894, filed Jan. 29, 1965 and now abandoned.

Field of the invention

This invention is a device for measuring small changes in fluid pressure and is adapted for use in deep bore holes such as oil or gas wells.

Summary of the invention

This invention relates to the measurement of very small changes in fluid pressure and more particularly to an automatic, remote-reading system for recording such changes as a function of time. In a preferred embodiment, the system is specifically adapted for use within deep bore holes, such as oil and gas wells, whereby a continuous record of downhole pressure changes is obtained at the surface of the earth.

The system includes means for balancing the pressure of a reference cell against the pressure of the environment wherein small changes are to be continually measured. The pressure of the reference cell is exerted against one fluid within a capillary or other small bore diameter tube while the pressure of the environment is exerted in the opposing direction against a second fluid within said tube which is substantially immiscible with the first fluid. Means are included to seek out and hold the interface formed by the two fluids. The latter means comprises an automated pump and valve assembly for transferring an accurately metered volume of fluid to or from the reference cell as needed to compensate for changes in the environment pressure, thereby returning the interface to its null position. A continuous cumulative record of the volume of fluid transferred to and from the reference cell is readily calibrated to provide the desired record of pressure changes.

Brief description of the drawing

FIGURE 2 is an electrical circuit diagram, partly in schematic form, of the control center which directs the operation of the pump and valves in response to signals generated by the pump piston position switches and the interface detection means.

Description of the preferred embodiment

Figure 1:
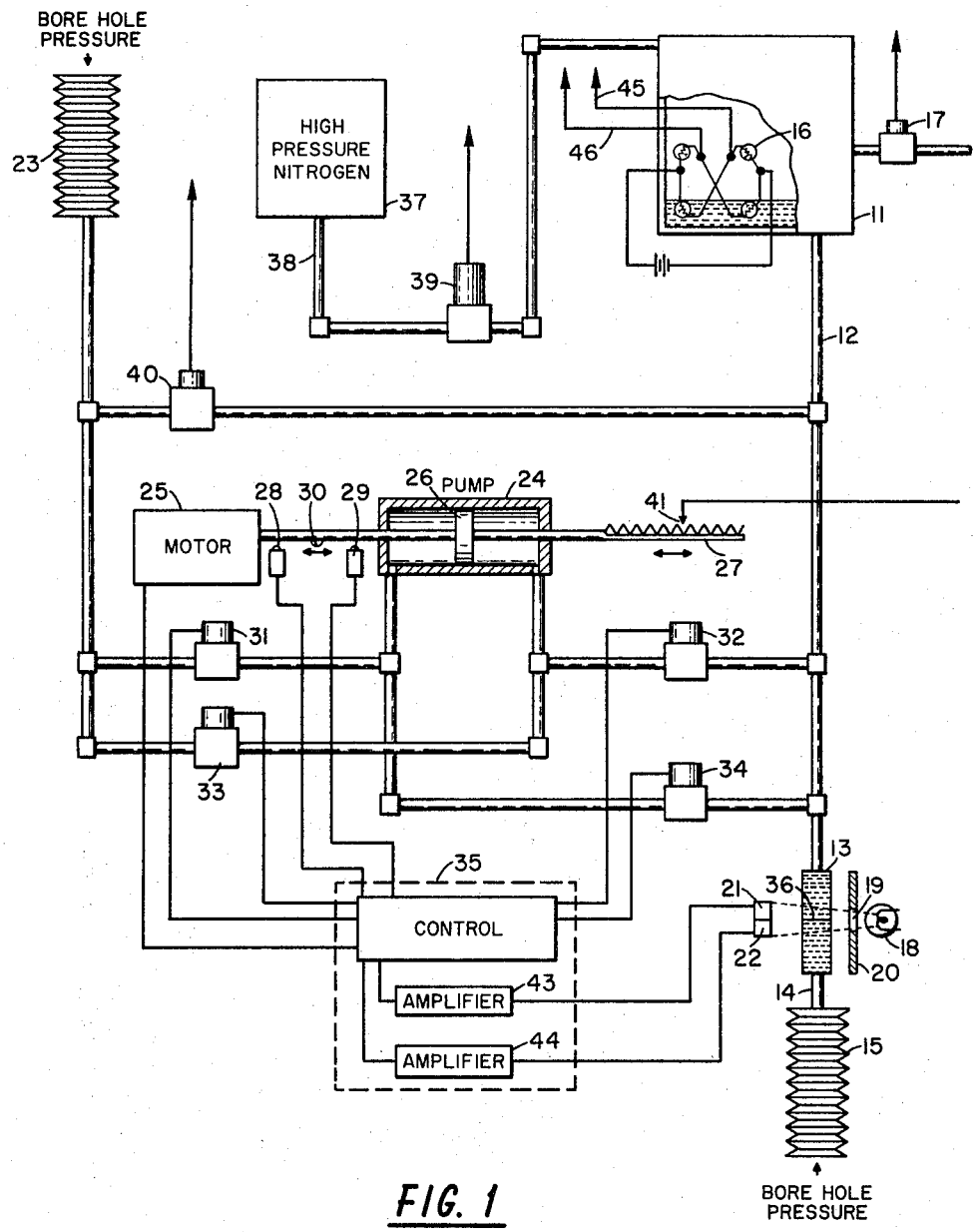
FIGURE 1 is a schematic diagram showing the various elements and subcombinations of a preferred embodiment of the invention.

Referring to FIGURE 1, the system of the invention includes reference cell 11 connected by means of a conduit 12 with one end of the capillary tube 13. The opposite end of the capillary 13 is connected by means of a conduit 14 with a pliable, fluid-filled, membraneous envelope 15. The reference cell is equipped with liquid-level sensing means 16 and relief valve 17 the purpose of which will be explained later.

The system further incldues light source 18 positioned to direct light through aperture 19 of shield 20. The light source and aperture are further positioned to direct light upon capillary 13 and to impinge any transmitted light upon one or both of photocells 21 and 22 as further explained below.

The system further includes a collapsible, fluid-filled reservoir 23 in combination with means for automatically transferring accurately metered volumes of the fluid to and from the reference cell in response to the signals generated by photoelectric cells 21 and 22. The fluid transfer means includes positive displacement pump 24, driven by reversible D.C. motor 25. The position of piston 26 within the pump chamber is continuously indicated by variable resistance 27.

The positions of switches 28 and 29, respectively, determine the polarity of the current supplied to motor 25. The polarity of the current determines the direction of rotation of the armature of the motor, which in turn controls the direction of motion of piston 26. Cam 30 mounted on the pump shaft momentarily closes switch 28 when piston 26 has reached the left-hand limit of its stroke; then momentarily closes switch 29 as the piston reaches the right-hand limit of its stroke; and so on repeatedly. Switches 28 and 29 also reverse the position of the pump valves 31, 32, 33, and 34 as will be explained later.

Valves 31, 32, 33 and 34 control the transfer of fluid between reservoir 23 and reference cell 11. As will be seen in the explanation of the control center 35, the valves operate in paired coordination. When one valve of a pair is in a given position, open or closed, the other valve of that pair is in the same position. Valves 31 and 32 form one pair; valves 33 and 34, the other. Moreover, the two pairs of valves operate in opposed coordination. During operation of the system, one pair of valves is open and the other is closed. However when the system is in a balanced state, both pairs of valves are closed to prevent fluid migration through the system.

Transfer of fluid between reservoir 23 and reference cell 11 is accomplished in the following manner. When piston 26 is moving from left to right, valves 31 and 32 are open, and valves 33 and 34 are closed, fluid is discharged from the right side of the pump through valve 32, conduit 12, and into reference cell 11. Concurrently, fluid is drawn into the left side of the pump through valve 31 from reservoir 23. When the piston reaches the right-hand limit of its stroke and begins to move from right to left, the position of the valve pairs is reversed by switch 29 and the control center 35, in a manner later described. That is valves 31 and 32 are closed and valves 33 and 34 are opened. With the piston moving from right to left and the valve positions reversed, fluid continues to be transferred from the reservoir 23 to the reference cell 11.

A reversal of valve positions also becomes necessary whenever the direction of borehole pressure change reverses. For example, during a period of increasing borehole pressure the valve positions are fixed to provide a transfer of fluids from reservoir 23 to reference cell 11. In the event the borehole pressure begins to decrease rather than increase, interface 36 will move below the position shown in FIGURE 1, thereby causing both photocells 21 and 22 to be activated by light rays emanating from source 18, passing through capillary 13, and through the transparent or translucent fluid contained therein at the level of the photocells. In response to such activation, control center 35 reverses the position of each of valves 31, 32, 33 and 34.

The system is specifically adapted for use in an environment of high absolute pressure, such as normally found at substantial depths in oil and gas wells. However, only certain portions of the system must be built to withstand a high ratio of internal to external pressure, or vice versa; namely, the electronics package, the high pressure nitrogen supply 37, conduit 38 and motor driven valve 39. The remaining portions of the system need not be subjected to a high pressure differential since it is convenient to flood the remaining exterior portions of the system with a suitable fluid for equalizing the external and internal pressures.

Initial preparation of the system is usually carried out at atmospheric pressure. This involves the setting of valves 31, 32, 33, 34 and 39 to their closed positions, loading high pressure nitrogen supply 37, setting valve 40 to an open position, and filling the remaining portions of the system with suitable volumes of opaque and transparent (or translucent) fluids, respectively.

Nitrogen supply chamber 37 is loaded to a pressure which, upon subsequent opening of valve 39, is sufficient to fill reference cell 11 with nitrogen to the level of sensing means 16, at a pressure equal to the pressure of the environment wherein small changes in pressure are to be measured. For example, if the volume of chamber 37 and the operational gas-filled volume of cell 11 are equal, then the minimum initial nitrogen pressure required in supply chamber 37 is double the absolute pressure of the environment in which the system is to be immersed (neglecting the volume of interconnecting conduit 38 and valve 39).

The opaque and transparent fluids which fill capillary 13 must of course be immiscible in order to form a stable interface 36. Additionally, for purposes of the system as illustrated in FIGURE 1 the opaque, or optically dense fluid must have a specific gravity somewhat greater than the specific gravity of the transparent fluid.

The system is then ready for lowering into a well to the depth of the pressure changes to be measured. During the trip downhole substantially the same pressure is exerted upon fluid reservoir 23 as is exerted upon membraneous envelope 15. Equal pressures upon these two portions of the system will prevent any substantial tendency of the two fluids to become intermixed or otherwise adversely distributed in the system. Similarly, the tendency of pressure sensitive element 15 to become ruptured during the trip is substantially eliminated.

Although reference cell 11 may initially be filled with a high ratio of gas to liquid volumes, lowering of the system to any substantial depth below the level of wellbore fluids will cause a substantial compression of the gaseous phase. Stated otherwise, fluid from reservoir 23 is forced through neutralizing valve 40 and into reference cell 11.

When the system has reached the level of interest, motor driven valve 39 is slowly opened by means of a manually operated control at the surface of the earth, which causes a displacement of fluid from reference cell 11. When the gas-liquid interface reaches the level illustrated in FIGURE 1, liquid level sensor 16 signals the operator to close valve 39. Neutralizing valve 40 is then closed by a manually operated control from the surface, whereupon the system is ready to be placed on automatic control. The closing of valves 39 and 40 may also be automated, if desired.

During automatic operation only two signals are transmitted to the surface of the earth. One signal indicates the position of piston 26 within the chamber of pump 24, while the other signal indicates whether the borehole pressure is increasing or decreasing. The pump position is indicated by variable resistance 27 or other means to indicate the relative position of the pump shaft. For example, variable resistance 27 is suitably coupled with a multivibrator circuit, the frequency of whose output depends upon the position of tap 41.

Rising borehole pressure is characterized by a displacement of interface 36 toward the upper end of capillary 13. Such displacement of the interface places the opaque fluid between light source 18 and each of photoelectric cells 21 and 22. When the interface is so displaced amplifiers 43 and 44 receive reduced signals from the photocells and relays 61 and 62 are relaxed. As will later be more fully explained, relaxation of these relays cause a signal which is indicative of increasing pressure to be generated and transmitted to the surface of the earth.

On the other hand, a decreasing borehole pressure is characterized by the displacement of interface 36 toward the lower end of capillary 13. In this event, light from source 18 reaches both photoelectric cells 21 and 22 causing both amplifiers 43 and 44 to receive increased signals, which in a like manner is in turn transmitted to the surface of the earth to indicate decreasing borehole pressure.

Since the volume of fluid metered by one stroke of piston 26 is accurately known, the number of strokes (or the fraction of a single stroke) completed during a single period of continuously increasing borehole pressure is readily calibrated in units of pressure change. That is, the volume of fluid transferred by pump 24 during a period of increasing pressure represents the volume of fluid added to reference cell 11 necessary to compensate for the pressure change experienced within the well at the depth of pressure sensitive element 15.

In the embodiment shown, liquid level sensing means 16 consists essentially of four thermistors connected in a bridge circuit. The voltage supplied to the bridge circuit must be sufficient to cause internal heating of the thermistors. However, so long as reference cell 11 remains liquid-full the rate of heat dissipation from each thermistor is sufficient to prevent a significant temperature rise. Once the liquid level falls below the two upper thermistors, internal heating causes the temperature of the two upper thermistors to rise above the temperature of the two immersed thermistors, whereby the bridge circuit becomes unbalanced, generating a difference in potential across leads 45 and 46, which difference in potential is employed to turn on a signal light at the surface, indicating that motor valve 39 and neutralizing valve 40 should be closed. This operation may also be automated, as will readily occur to those skilled in the art.

As an example of materials which have been found suitable in the construction of the system illustrated in FIGURE 1, conduit 12 and all similar conduits may suitably be rigid metal tubing, such as copper or stainless steel. Capillary 13 is preferably composed of a material having a high resistance to wettability or dyeing, in order to avoid the difficulties which would arise in the event the opaque fluid of envelope 15 should adhere to the capillary walls. Specifically, when interface 36 rises and later falls, it becomes apparent that any tendency of the opaque fluid to coat the walls of capillary 13 may cause one or both of the photocells to receive a false signal. "Teflon" tubing has been found especially suitable as a capillary material. Suitable translucent fluids include the light hydrocarbon oils, such as kerosene or naphtha, while India ink has been found suitable as an opaque fluid. Membranous envelope 15 may suitably be composed of one mil "Mylar" plastic film, and the same is true of reservoir 23, although a somewhat thicker film may be used for the latter, since a lesser sensitivity to pressure change is satisfactory. A suitable matched pair of photoelectric cells is available from Texas Instruments, Incorporated, including for example their light sensor LS-221.

In FIGURE 2 the details of control center 35 are shown, including relays 61 and 62 which receive signals from photocells 21 and 22, via amplifiers 43 and 44, respectively, the operation of the amplifiers being stabilized by choppers 74. The relaxed position of these relays, as shown, corresponds to a position of interface 36 somewhat above its null point, sufficient to reduce the signal from cell 21 below a certain critical voltage, which is indicative of an increasing borehole pressure. During periods of stable pressure, interface 36 remains at its null point, causing the generation of a signal by cell 21 sufficient to energize relay 61, while relay 62 remains in the open or relaxed position.

For a period of decreasing borehole pressure, interface 36 falls to a level which permits increased light to strike cell 22, whereby both relays 61 and 62 are closed.

The logic developed by relays 61 and 62 is employed to control the direction of flow between reservoir 23 and reference cell 11. Direct control of the flow direction is determined by the positions of valves 31, 32, 33 and 34, as discussed in connection with FIGURE 1; however, the valve positions are controlled by relays 63 and 64. Relay 65 controls the polarity of current supplied to motor 25 and also connects relays 63 and 64 with the proper poles of relays 61 and 62 in response to signals received from relay 66. For example, the relaxed position of relay 61 completes a circuit connecting one pole thereof with the coil of relay 63, only when relay 65 is also in the relaxed position. When relay 65 is energized, the relaxed position of relay 61 connects one pole thereof with the coil of relay 64.

Latching relay 66 is actuated by the alternate momentary closing of switches 28 and 29 by cam 30 as discussed earlier. Specifically, when piston 26 reaches the right-hand limit of its stroke, relay 66 is closed, which in turn energizes relay 65, thereby reversing both the pump motor and the pump valves. Relay 66 remains closed and relay 65 remains energized until cam 30 momentarily closes switch 28, which in turn opens relay 66 allowing relay 65 to relax.

Relaxation of relay 67 disconnects the pump motor

An example of the operation of the device under a specific set of conditions will further illustrate the operation of the invention. For the purpose of illustration, it is assumed that the pump piston 26 is moving from left-to-right and the pressure is increasing, as shown by condition I on the following chart. At the beginning of the left-to-right piston stroke, cam 30 trips switch 28 which breaks the circuit of relay 66, relaxing the relay. With relay 66 in its relaxed position, relay 65 is also relaxed. Under conditions of increasing pressure, the interface 36 rises above its null point and the opaque fluid obscures photocells 21 and 22. Since both photocells 21 and 22 are obscured by the opaque fluid, neither amplifier 43 nor 44 transmits a signal and therefore relays 61 and 62 are in their relaxed positions. With relays 61 and 62 in their relaxed position, the voltage differential between line 72 and 71 is indicative of an increasing pressure. With relays 61, 62 and 65 in a relaxed position, relay 63 is energized and relay 64 is relaxed. The closing of relay 63 energizes the circuit to valves 31 and 32, opening these valves and also completes the circuit to relay 67 thereby starting the pump motor. The pump transfers fluid into the reference cell until the pressure in the reference cell equals that of the environment and the interface 36 is returned to its null position. Then assuming the pump piston is still travelling from left to right at this time, the relays of the system assume the positions shown in condition V of the chart and will so remain until another pressure change occurs.

The following chart gives the relaxed or energized condition of each of the relays in the pump valve system under varying conditions:

|  | Condition | | | | | |
| --- | --- | --- | --- | --- | --- | --- |
|  | I | II | III | IV | V | VI |
| Well Pressure | Increase | Increase | Decrease | Decrease | Balance | Balance. |
| Piston Movement | Left to Right | Right to Left | Left to Right | Right to Left | Left to Right* | Right to Left.* |
| Relay 66 | Relaxed | Energized | Relaxed | Energized | Relaxed | Energized. |
| Relay 65 | do | do | do | do | do | Do. |
| Cell 21 | Off | Off | On | On | On | On. |
| Cell 22 | Off | Off | On | On | Off | Off. |
| Relay 61 | Relaxed | Relaxed | Energized | Energized | Energized | Energized. |
| Relay 62 | do | do | do | do | Relaxed | Relaxed. |
| Relay 63 | Energized | do | Relaxed | do | do | Do. |
| Relay 64 | Relaxed | Energized | Energized | Relaxed | do | Do. |
| Relay 67 | Energized | do | do | Energized | do | Do. |

*Direction of movement before coming to rest.

from its power supply, an event which occurs only when relay 61 is closed and relay 62 is open, a condition which indicates that interface 36 is holding at its null point.

Relay 68 is energized whenever the liquid level of reference cell 11 falls to a position just below the two upper thermistors of liquid level sensing means 16 (FIGURE 1).

Resistances 69 and 70 are employed in combination with the power supply to select a voltage indicative of rising borehole pressure, and a different voltage to indicate decreasing borehole pressure. Specifically, the difference in potential across leads 71 and 72 depends upon the positions of relays 61 and 62, as determined by the location of interface 36, discussed earlier. When the borehole pressure is increasing the difference in potential across leads 71 and 72 is the difference between the voltage of the power supply and the common ground for the system. When the borehole pressure is decreasing the differential across leads 71 and 72 is the difference between the voltage of the power supply and the common less the voltage drop across resistor 70. When the borehole pressure is steady the circuit between lead 71 and the power supply is broken and no difference in potential between leads 71 and 72 is indicated by the voltmeter. In this manner a voltage signal is obtained which is indicative of the pressure condition. This signal is transmitted to the surface and recorded, together with a signal to indicate pump position.

A continuous record of the position of piston 26 and the direction of flow between reservoir 23 and cell 11 is readily converted to a continuous record of differential pressure change, since the product of the gas volume and pressure in cell 11 is constant at a constant temperature.

Diode 73 permits alternate use of conductor 71 for two purposes. First, a negative voltage is applied to operate valve 40; subsequently the same line is used to transmit a signal to indicate the direction of pressure change, as discussed earlier.

While certain specific embodiments have been disclosed, other variations within the scope of the appended claims will readily occur to those skilled in the art. Inert gases other than nitrogen are also suitable for use in reference cell 11. For example, excellent results have been obtained using helium as the gaseous medium. Since helium has little tendency to dissolve in the liquid phase, such a system has long-term, pressure stability. Also, it is feasible to employ an opaque fluid which is lighter than the transparent or translucent fluid, whereby the portions of the system occupied by the respective fluids would be reversed. Still further, it is possible to use other interface detection means instead of the photocell combination of FIGURE 1.

What is claimed is:
1. An apparatus adapted to be lowered within a well to detect pressure changes at a selected depth within the well which comprises a reference cell adapted to be at least partially filled with a gas at said selected depth; a hollow member which is changeable in internal volume in response to differences between internal and external pressures; a small diameter conduit interconnecting and arranged relative to the said reference cell and said hollow member to define a fluid-containing system wherein a first liquid can fill said hollow member and a portion of said conduit to a preselected liquid level within said conduit; liquid interface detection means to detect changes in the level of said first liquid; a reservoir cell adapted to be filled with a second liquid; liquid transfer means responsive to said liquid interface detection means to transfer said second liquid between said reservoir cell and said fluid-containing system so as to maintain the level of said first liquid in said small diameter conduit and means responsive to said liquid transfer means to record the volumes and directions of flow of liquid transferred by said liquid transfer means.

2. An apparatus as defined in claim 1 including liquid level sensing means within said reference cell to sense the level of liquid in the cell.

3. An apparatus as defined in claim 1 including means for at least partially filling said reference cell with said gas at said selected depth.

4. An apparatus as defined in claim 1 wherein the optical density of the first fluid differs substantially from the optical density of the second fluid.

5. An apparatus as defined in claim 4 wherein said liquid interface detection means comprises at least two photoelectric cells and a source of light, said cells and said source being disposed on opposite sides of said conduit.

6. An apparatus as defined in claim 1 wherein said liquid transfer means comprises a positive displacement pump means and valve means for transferring said second liquid between said reservoir cell and said fluid-containing system in response to said liquid interface detection means.

7. An apparatus as defined in claim 6 including control means for activating and reversing the direction of movement of said pump means and activating and reversing said valve means in response to said liquid interface detection means.

8. An apparatus as defined in claim 6 including control means for activating and reversing the direction of movement of said pump means and activating and reversing said valve means in response to the travel of said pump means.

9. An apparatus as defined in claim 1 wherein said gas is nitrogen.

10. An apparatus as defined in claim 1 wherein said gas is helium.

References Cited

UNITED STATES PATENTS 3,247,712   4/1966   Johnson et al. _____ 73—152

LOUIS R. PRINCE, *Primary Examiner.*

D. O. WOODIEL, *Assistant Examiner.*